United States Patent
Saranu et al.

(10) Patent No.: US 8,000,751 B2
(45) Date of Patent: Aug. 16, 2011

(54) METHOD FOR PROVIDING CALLING PARTY SELECTABLE RING TONES IN A WIRELESS COMMUNICATIONS NETWORK

(75) Inventors: Shiva Narayana Saranu, Guntur (IN); Yogananda Rao Chillariga, Hyderabad (IN)

(73) Assignee: Alcatel Lucent, Paris (FR)

( * ) Notice: Subject to any disclaimer, the term of this patent is extended or adjusted under 35 U.S.C. 154(b) by 1047 days.

(21) Appl. No.: 11/824,356

(22) Filed: Jun. 29, 2007

(65) Prior Publication Data

US 2009/0005017 A1 Jan. 1, 2009

(51) Int. Cl.
*H04B 1/38* (2006.01)
(52) U.S. Cl. .................. 455/567; 455/414.1; 455/422.1; 455/433; 455/435.1
(58) Field of Classification Search .................. 455/418, 455/419, 567, 414.1, 422.1, 433, 435.1
See application file for complete search history.

(56) References Cited

U.S. PATENT DOCUMENTS

| | | | |
|---|---|---|---|
| 6,418,330 B1 * | 7/2002 | Lee ................................ | 455/567 |
| 7,493,125 B2 * | 2/2009 | Nagesh et al. ............. | 455/456.1 |
| 7,616,741 B2 * | 11/2009 | Reynolds et al. .......... | 379/88.17 |
| 2006/0045252 A1 * | 3/2006 | Gorti et al. ................ | 379/201.02 |
| 2007/0026852 A1 * | 2/2007 | Logan et al. ................ | 455/422.1 |
| 2007/0129067 A1 * | 6/2007 | Summer et al. ............ | 455/414.1 |
| 2007/0135127 A1 * | 6/2007 | Andersson .................... | 455/445 |
| 2010/0087182 A1 * | 4/2010 | Stewart et al. ................ | 455/419 |

* cited by examiner

*Primary Examiner* — Temica M Beamer
(74) *Attorney, Agent, or Firm* — Fay Sharpe LLP

(57) ABSTRACT

A method of providing a Calling Party Selectable Ring Tone to a Called Party Mobile Terminal in a wireless communications network is provided. The Called Party Mobile Terminal is connected to a Music Platform on the network for receiving music that can be selected by the Calling Party to be played by the Called Party Mobile Terminal as a Ring Tone for alerting the Called Party to an incoming call from the Called Party. The Called Party can select the music for the Ring Tone prior to making the call or while making the call.

20 Claims, 7 Drawing Sheets

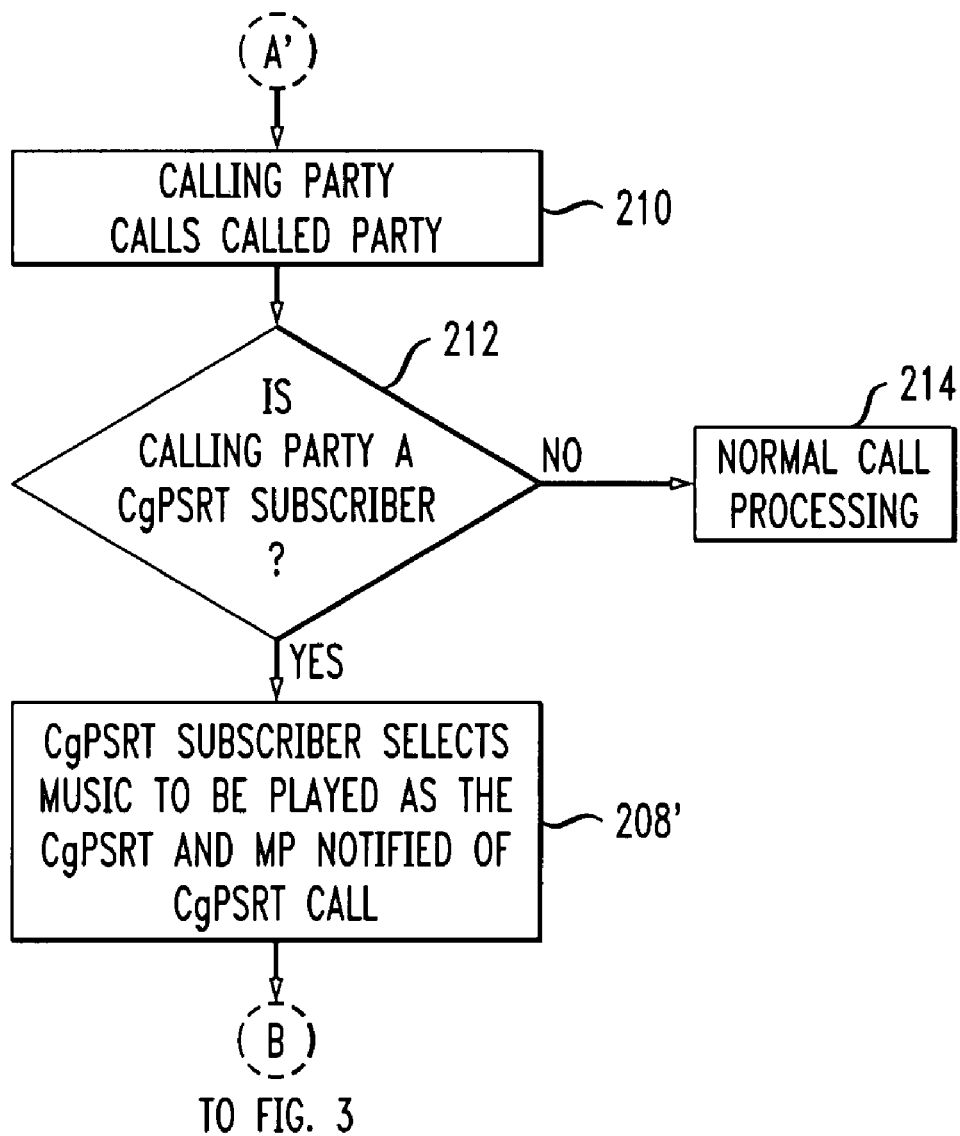

US 8,000,751 B2

METHOD FOR PROVIDING CALLING PARTY SELECTABLE RING TONES IN A WIRELESS COMMUNICATIONS NETWORK

BACKGROUND OF THE INVENTION

This invention relates to a method for alerting a Called Party to an incoming call from a Calling Party, and more specifically to alert using a Ring Tone that can be selected by the Calling Party.

While the invention is particularly directed to the art of wireless communications networks, and will be thus described with specific reference thereto, it will be appreciated that the invention may have usefulness in other fields and applications.

By way of background, phones including wireless communications terminals, also known as Mobile Terminals, play an Alert to indicate to the User, also referred to as the Called Party, that an incoming call is being directed to the Called Party's Mobile Terminal.

Wireless communications network Service Providers enable Called Party wireless subscribers to choose individualized Ring Tones which can be played for the Alert.

The present invention contemplates a new and improved method of providing Ring Tones by allowing the Calling Party to choose the Ring Tones played for the Called Party.

SUMMARY OF THE INVENTION

A method for providing a Calling Party Selectable Ring Tone to a Called Party Mobile Terminal in a wireless communications network is provided.

In one aspect of the invention the method includes a method of providing a Calling Party Selectable Ring Tone (CgPSRT) to a Called Party Mobile Terminal (CdP_MT) in a wireless communications network including sending a CgPSRT Alert message to the CdP_MT instructing the CdP_MT to connect to a traffic channel and play music as a CgPSRT to alert the Called Party to an incoming call from the Called Party.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 7 is a flow chart illustrating an alternate embodiment of the invention described herein.

DETAILED DESCRIPTION

Figure 1:
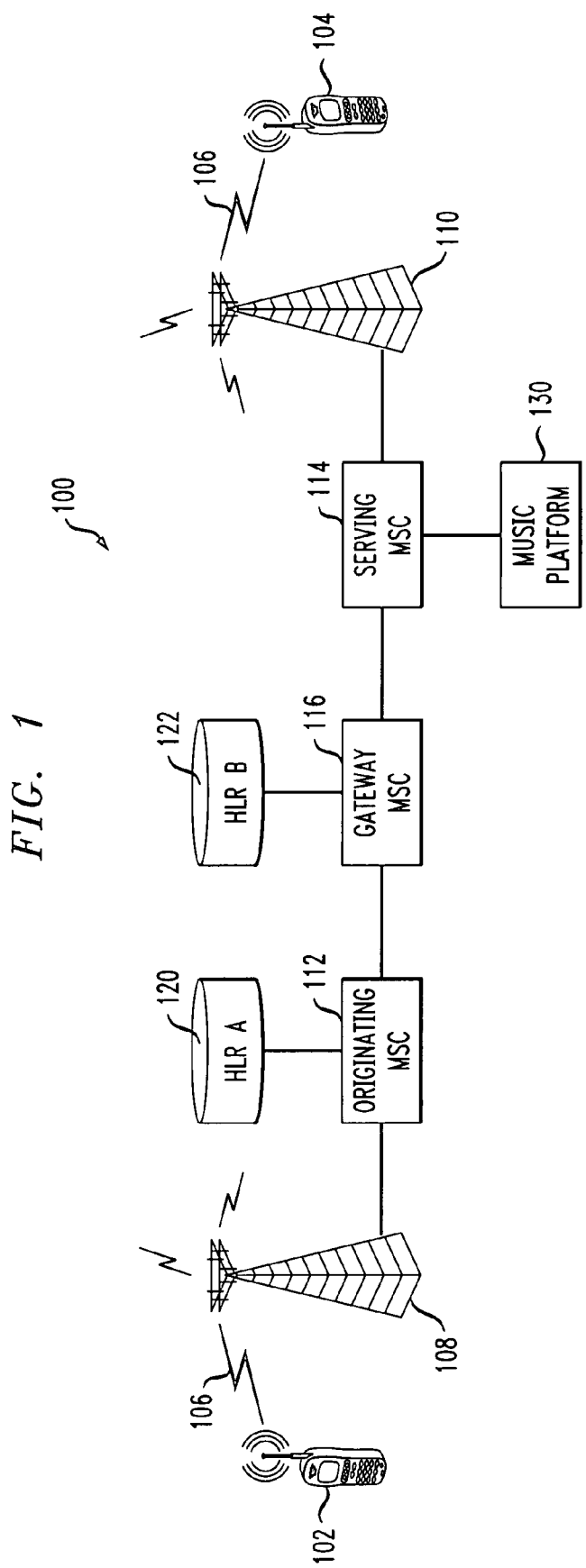
FIG. 1 is a block diagram of a portion of a wireless communications network for utilizing the invention described herein.

Referring now to the drawings wherein the showings are for purposes of illustrating the preferred embodiments of the invention only and not for purposes of limiting same, FIG. 1 provides a view of the preferred system according to the present invention. As shown, FIG. 1 illustrates portions of a wireless telecommunications network shown generally at 100. The wireless network 100 can be a CDMA, GSM or other type of wireless network. A Calling Party, using a Calling Party Terminal, referred to as a Calling Party Mobile Terminal (CgP_MT) 102 can communicate with a Called Party over the wireless network 100 by calling the Called Party Mobile Terminal (CdP_MT) 104. The CgP_MT 102 and CdP_MT 104 can also referred to as wireless phones, or cellular phones, or User Equipment, among others.

The wireless network 100 includes a plurality of Base Stations for providing over-the-air communications via wireless connections 106 to mobile terminals in their proximity. For simplicity, only the Base Stations serving the CgP_MT 102 and CdP_MT 104 are shown at 108 and 110 respectively.

The wireless network 12 also includes a plurality of wireless switching nodes known as Mobile Switching Centers (MSCs), responsible for handling call setups, and routing calls and call messaging to/from the appropriate MSCs to enable the CgP_MT and CdP_MT to communicate over the network 100. The MSCs include an Originating MSC (OMSC) 112 serving the CgP_MT 102 and a Serving MSC (SMSC) 114 serving the CdP_MT 104. A Gateway MSC (GMSC) 116, also known as an Incall MSC, is shown connected between the OMSC 112 and SMSC 114.

The wireless network 100 includes one or more Location Registers, which can include one or more Home Location Registers (HLR), including the Calling Party's HLR (HLR A at 120), and the Called Party's HLR (HLR B at 122). The HLRs 120, 122 are databases containing wireless subscriber information, also referred to Subscriber Profiles, including service subscription information defining the calling features for which the subscriber has privileges to use, as well as perhaps service feature restrictions pertaining to the subscriber if so desired. This information can be used by the OMSC 112 and/or SMSC 114 to determine the features a Calling Party and/or Called Party can access as described in some detail below. The HLR databases can also include information used by the MSCs 112, 114, 116 for routing calls in the network 100.

A Music Platform (MP) is shown at 130 connected to the SMSC 114 for providing the CgPSRT functionality as described herein. The MP 130 can be a Server or other computing and storage device suitable for enabling CgPSRT Subscribers to connect thereto via a User Interface (UI), select music to be played as CgPSRT Alerts, store the selected music in electronic form, associate CgPSRT Subscriber with their music selections, and provide the music to the CdP_MT 104 as CgPSRT Alerts as described in further detail below. The network 100 can include a plurality of MP 130 if so desired.

Figure 2:
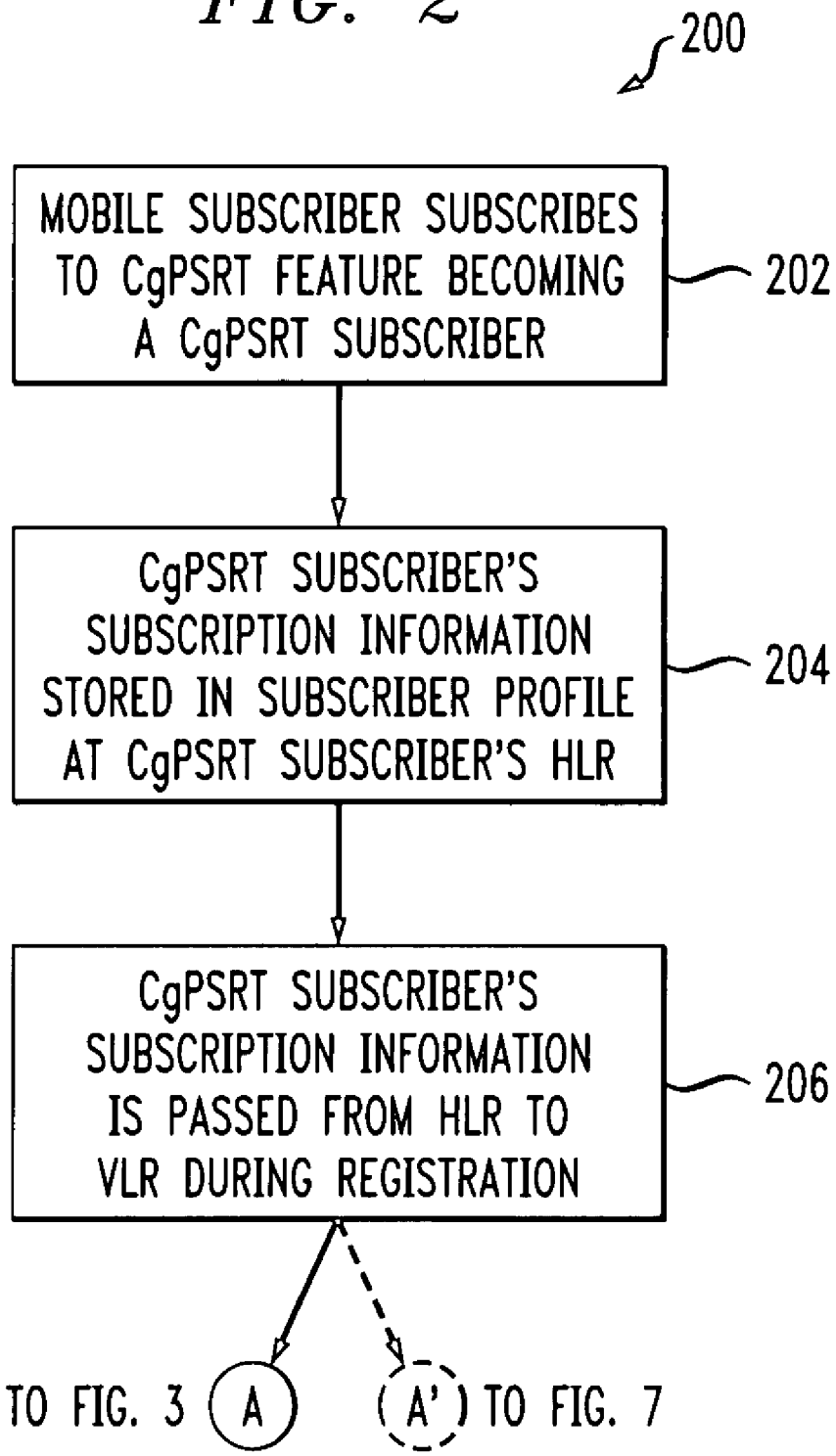
FIG. 2 is a flow chart illustrating the invention described herein.

Referring now to FIG. 2, a method of providing a Calling Party Selectable Ring Tone (CgPSRT) to a CdP_MT 104 is shown generally at 200. The method 200 can be offered to wireless network subscribers by the network Service Provider as a subscription feature if so desired. The CgPSRT feature enables a CdP_MT 104 to be connected to a CgPSRT Music Circuit for playing a song, portions of music, etc. that can be selected by the Calling Party (or in some cases the song can be selected by the Network, if so desired) as an Alert played by the CdP_MT 104 for alerting the Called Party to an incoming call. The CgPSRT Alert is played by the CdP_MT 104 until the call is answered or the circuit is otherwise disconnected such as when the Calling Party is directed to the Called Party Voice Mail system, etc. Once the incoming call is answered, the music circuit is disconnected and the Called Party is connected to the incoming call circuit.

A mobile subscriber subscribes to the CgPSRT feature by registering for this service with the Service Provider thereby becoming a CgPSRT Subscriber at 202. The CgPSRT Subscriber's subscription information is stored in the Subscriber Profile at the CgPSRT Subscriber's Home Location Register at 204. When the CgPSRT Subscriber is roaming, the CgPSRT Subscriber's MT Registers with the wireless network and the CgPSRT Subscriber's subscription information is passed to the Visitor Location Register (VLR) during Registration at 206 in a known manner.

Figure 3:
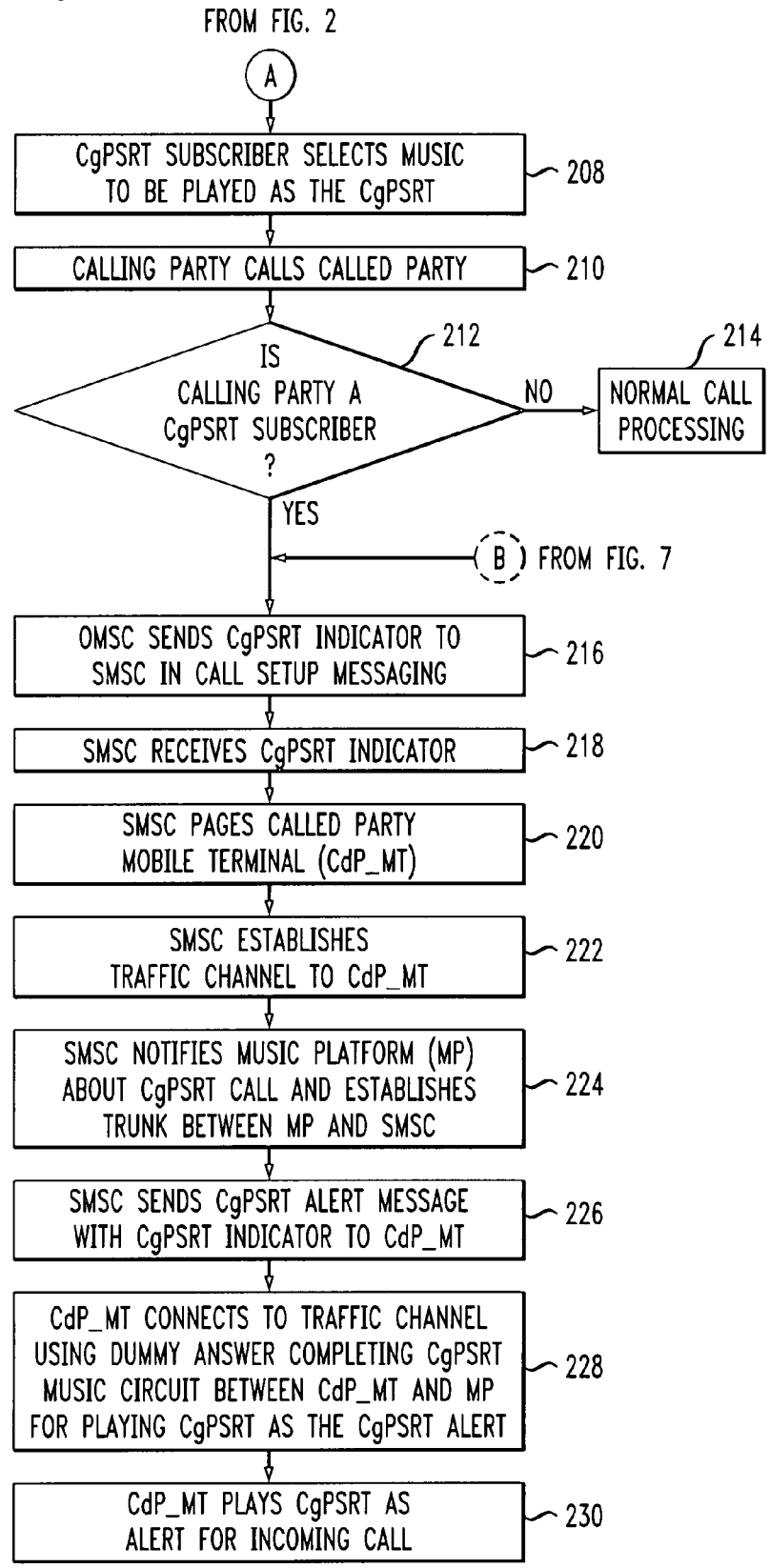
FIG. 3 is a flow chart illustrating the invention described herein.
Figure 4:
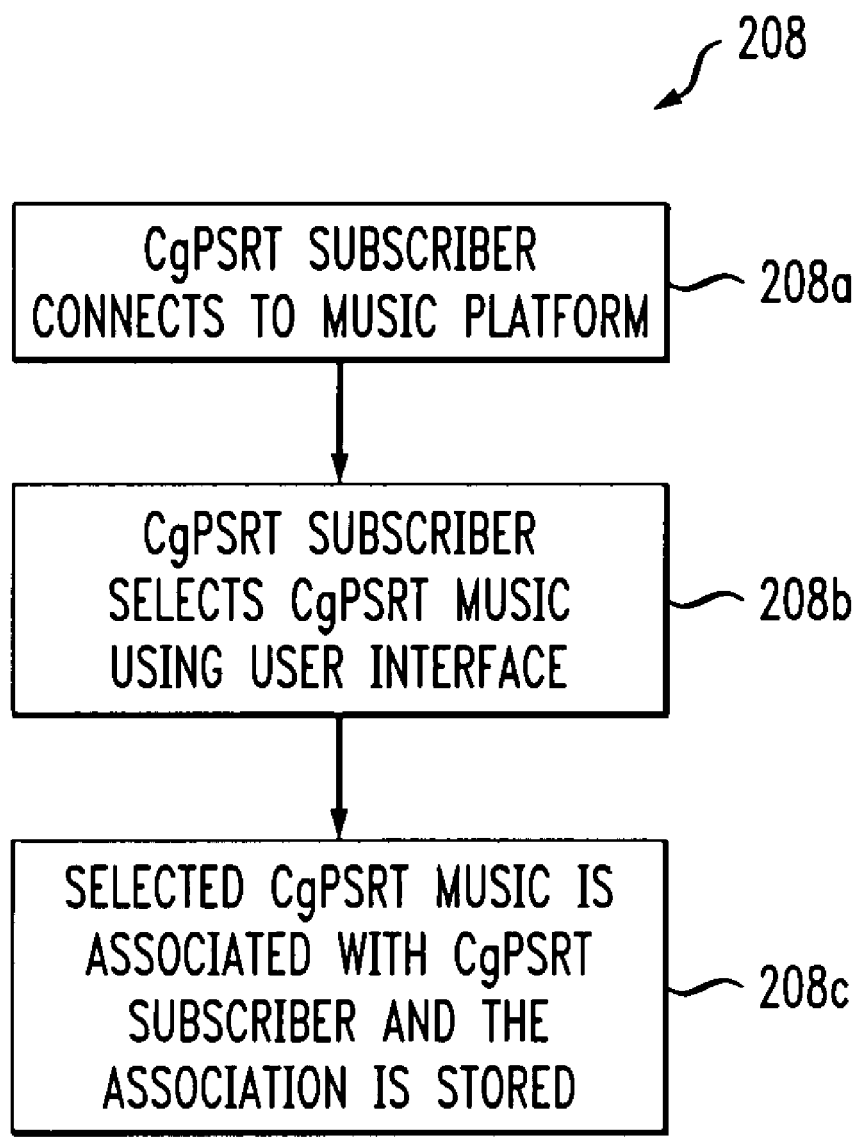
FIG. 4 is a flow chart illustrating the invention described herein.

Referring now to FIG. 3, the CgPSRT Subscriber can select music to be played as the CgPSRT at 208. An example, which should not be considered limiting, of the CgPSRT Subscriber selecting music for the CgPSRT at 208 is shown in further detail in FIG. 4. The CgPSRT Subscriber connects to the Music Platform 130 at 208a, such as by using the CgPSRT Subscriber's MT in a Voice connection or Internet connection. The CgPSRT Subscriber can select the music desired to be played as the CgPSRT using an interactive User Interface (UI) provided by the MP at 208b. The UI can be a voice response type UI for a Voice connection, or a Graphic User Interface (GUI) for an Internet type connection. It is contemplated that the CgPSRT Subscriber can, alternatively, connect to the MP UI in other manners for selecting the CgPSRT music, such as by using a home computer connected thereto via the Internet or a different phone, including a PSTN phone, utilizing a voice activated UI, etc., as is suitable for the particular application.

The MP 130 associates the music selected by the CgPSRT Subscriber with CgPSRT Subscriber and stores this association at 208c. In one example, which should not be considered limiting, the MP stores CgPSRT Subscriber information, such as the CgPSRT Subscriber's Directory Number, and/or Mobile Identity Number, and/or IMSI and associates this information with the selected music, such as by using a CgPSRT music identifier identifying the file containing the selected music. Alternatively, the music file itself can be stored in a more direct association with the CgPSRT Subscriber information, if so desired. Alternative music selections can be associated with the CgPSRT Subscriber in a similar manner. The CgPSRT Subscriber can change the CgPSRT music selection, in this manner, as many times as desired and can even select the music for the CgPSRT on a per call basis, if so desired. Further, if the music selection has not taken place when the call is made to the Called Party, as described below, the Called Party can either be connected to music selected by Network, or a conventional ring tone can be played.

Referring again to FIG. 3 the method 200 also includes the Calling Party (CgPSRT Subscriber) calling the called party at 210. The Originating MSC (OMSC) receives the Call Request generated by the call from the Calling Party and determines at 212 if the Calling Party is a CgPSRT Subscriber having sufficient privileges to make a CgPSRT call. The OMSC can make this determination by querying the Calling Party HLR 120, or checking with Calling Party subscription information stored locally, such as in a VLR or elsewhere, or in other manners similar to determining other subscription privileges of a Calling Party.

If it is determined that the Calling Party is not a CgPSRT Subscriber at 212, normal call processing using a conventional ring tone takes place at 214.

If it is determined that the Calling Party is a CgPSRT Subscriber at 212, the OMSC continues with call setup, sending a CgPSRT indicator to the SMSC 114 in call setup messaging at 216. The CgPSRT indicator indicates to other network Nodes, including the SMSC 114, that the call is to be a CgPSRT call. The CgPSRT indicator can also provide an indication that the Calling Party is a CgPSRT Subscriber having sufficient privileges to make the CgPSRT call.

Figure 5:
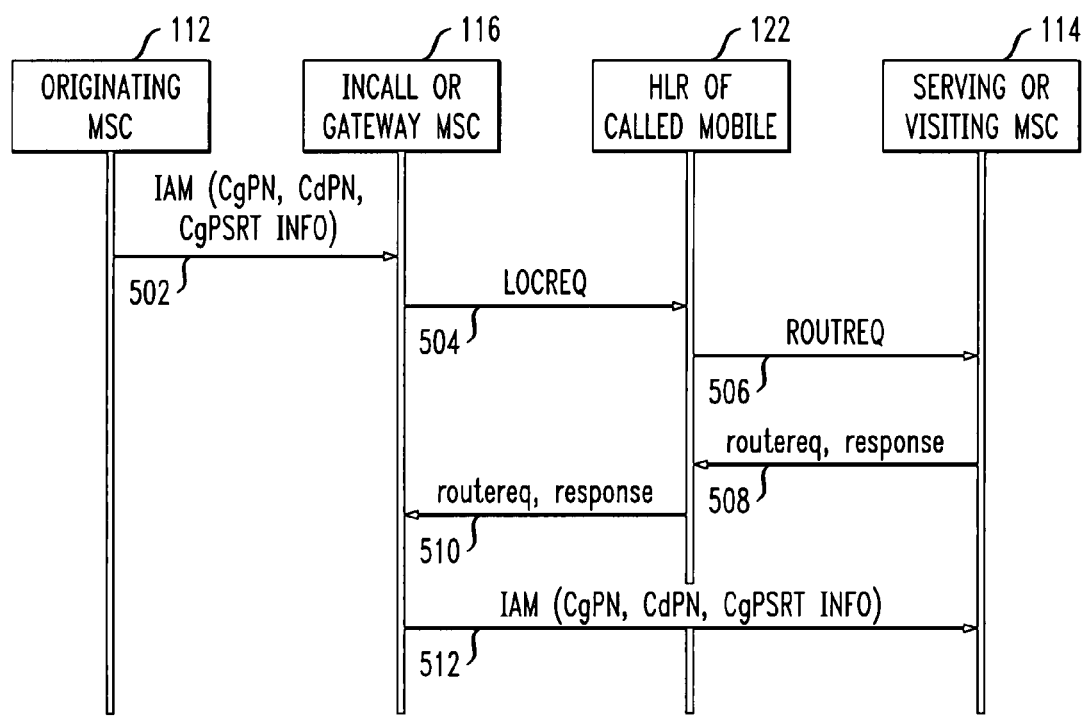
FIG. 5 is a call flow diagram of messaging used in the invention described herein.

Referring now to FIG. 5, an example of a CgPSRT indicator being sent from the OMSC to the SMSC in call setup messaging of 216 is shown in further detail. In this example, which should not be considered limiting, the CgPSRT indicator is a bit included in an Initial Address Message (IAM) message in a communications network using ISUP trunk signaling and IS-41 Inter-MSC signaling. The OMSC sends an IAM message including the Calling Party Phone Number, the Called Party Phone Number and the CgPSRT Indicator to the Gateway (GMSC) at 502. The GMSC 116 sends a Location_Request message (LOCREQ) to the HLR of the CdP_MT (HLRB) at 504. The HLRB 122 sends a Route-_Request message (ROUTREQ) to the SMSC 114 at 506. The SMSC 114 responds to the HLRB 122 with a Route_Request_Response message at 508 which is passed to the GMSC 116 at 510. The GMSC 116 then sends the IAM message with the CgPSRT indicator to the SMSC 114 at 512.

Figure 6:
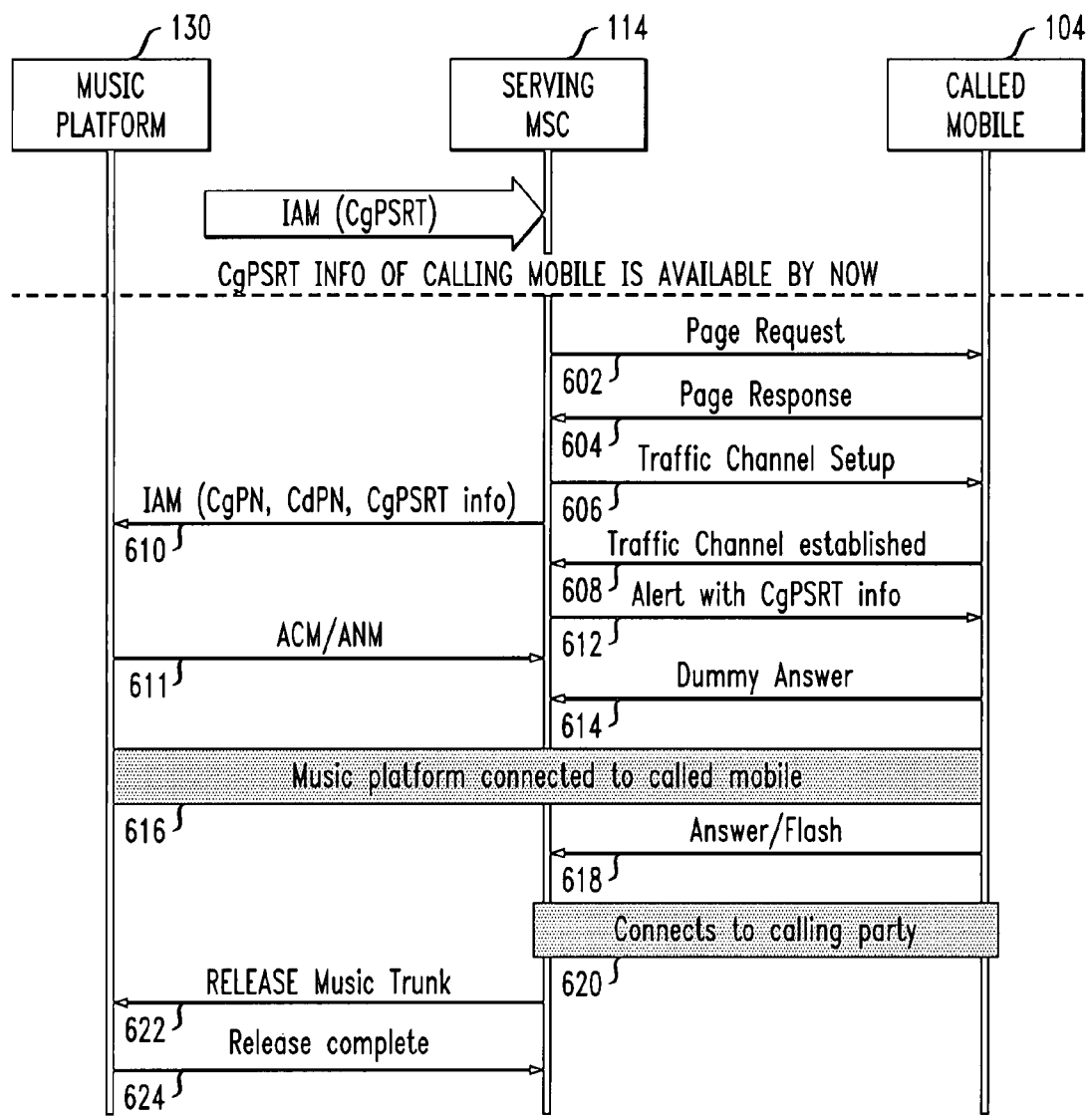
FIG. 6 is a call flow diagram of messaging used in the invention described herein.

Referring now to FIGS. 3 and 6, the SMSC 114 receives the CgPSRT indicator at 218 indicating that the call to the CdP_MT is a CgPSRT call. After the SMSC 114 receives the CgPSRT indicator at 218, the SMSC pages the CdP_MT at 220 as part of call setup as shown at 602 in the call flow diagram of FIG. 6. The CdP_MT responds to the SMSC 114 sending it a Page Response message at 604.

The method 200 further includes the SMSC 114 setting up a traffic channel, with the CdP_MT 104 at 222, as shown at 606 and 608 in FIG. 6. In an alternate embodiment, the SMSC 114 can also establish a traffic channel connecting the MP and the OMSC (and the CgP_MT), such as by using conferencing call circuits at the SMSC, to allow the Calling Party to hear the CgPSRT music being played for the Called Party CgPSRT Alert. In this manner, the Calling Party can hear what is being played for the Called Party every moment as it is being played for the alert.

The SMSC 114 also notifies the MP 130 that a CgPSRT call is being made from the CgPSRT Subscriber to the CdP_MT 104 and sets up a trunk, referred to as a Music Trunk, connecting the SMSC 114 to the MP 130 at 224. In one example, which should not be considered limiting, this is accomplished by the SMSC 114 sending an IAM to the MP 130 as shown at 610. The IAM message includes the Calling Party Phone Number, the Called Party Phone Number and the CgPSRT indicator. The MP 130 can reply to the SMSC with an Address Complete Message (ACM) at 611 indicating that the trunk circuit has been reserved, or using other suitable messaging depending on the messaging protocols used.

The MP 130 can use the Calling Party Phone Number and/or the Called Party Phone Number and/or other subscriber information received at 224 to select the music to be played for the CgPSRT Alert that the CgPSRT Subscriber has pre-selected at 208 using the association described above.

The SMSC 114 then sends a CgPSRT Alert message to the CdP_MT 104 at 226, as shown at 612, instructing the CdP_MT accept the incoming music and play it at the mobile as a ring tone. The CgPSRT Alert message 612 can be an existing Alert message having a special value to indicate the CgPSRT functionality. A conventional Alert message, existing previously in a known messaging protocol, can be modified to form the CgPSRT Alert message 612 by including a CgPSRT parameter providing CgPSRT functionality. This approach is backward compatible, in that older MTs not equipped with this functionality can ignore the CgPSRT parameters in the CgPSRT Alert message 612 and continue to function as before providing conventional ring tones. Alternatively, the CgPSRT Alert message 612 can be an entirely new message for Alerting the CdP_MT with the CgPSRT music as described herein, rather than the modified conventional Alert message.

The CdP_MT 104 responds to the CgPSRT Alert message 612 at 228 with a Dummy Answer 614 at connecting the CdP_MT to the SMSC 114 via a traffic channel call leg established at 222 above. The Dummy Answer is unlike a conventional answer message because the CdP_MT does not answer the incoming call. In this manner, the CdP_MT 104 is now connected to the MP 130 via a CgPSRT Music Circuit and the MP plays the CgPSRT ring tone over the CgPSRT Music circuit which the CdP_MT uses as a ring tone played over its speaker, to indicate to the Called Party that an incoming call is being received by the CdP_MT at 230.

When the Called Party answers the call, an Answer/Flash message is sent to the SMSC at 618 and the SMSC connects the Called CdP_MT 104 to the CgP_MT 102 forming a conventional call at 620. The SMSC 114 sends a RELEASE Music Trunk message to the MP 130 at 622 which releases the Music Trunk and signals the release as complete at 624 so that the call can take place in a normal manner.

Referring now to FIGS. 2, 3 and 7, an alternate embodiment of the method 200 is provided as indicated using the dashed A path in the flowcharts. In this embodiment, as shown in FIG. 7, the CgPSRT Subscriber selects the music to be used for the CgPSRT Alert, on a per call basis, while making the call. The Calling Party (CgPSRT Subscriber) calls the Called Party at 210 and it is determined if the Calling Party is a CgPSRT Subscriber at 212 in a similar manner as described above. If the Calling Party is determined to be a CgPSRT Subscriber at 212, the Calling Party selects the music to be played as the CgPSRT at 208' using the CgP_MT 102 to connect to the MP 130, as described with reference to 208a-208c in FIG. 4, above. However in this embodiment the MP 130 is notified of the CgPSRT call as part of the music selection process of 208', which may include the notification described in step 224 above. The Music Trunk between the MP 130 and the SMSC 114 can be established in this step 208' or in the order as described in step 224 above. After the music is selected at 208', the call is delivered to the CdP_MT as described above. This embodiment provides the Calling Party with greater flexibility in choosing the CgPSRT for the particular Called Party, if so desired.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of providing a Calling Party Selectable Ring Tone (CgPSRT) to a Called Party Mobile Terminal (CdP_MT) in a wireless communications network comprising:
    establishing a Music Trunk between a Serving MSC (SMSC) serving the CdP_MT and a Music Platform in a wireless network;
    establishing a traffic channel circuit from the SMSC and the CdP_MT in the wireless communications network;
    sending a CgPSRT Alert message to the CdP_MT instructing the CdP_MT to connect to the traffic channel and play a CgPSRT as an Alert;
    receiving a Dummy Answer Message from the CdP_MT in response to the CgPSRT Alert message;
    connecting the CdP_MT to the traffic channel; and
    sending CgPSRT music received from the Music Platform over the Music Trunk to the CdP_MT on the traffic channel for alerting a Called Party to an incoming call from the Called Party using the CgPSRT.

2. The method defined in claim 1 further comprising determining that the Calling Party is a CgPSRT Subscriber having sufficient privileges for making a CgPSRT call.

3. The method defined in claim 1 further comprising the Called Party selecting CgPSRT music from the Music Platform for use as the CgPSRT.

4. The method defined in claim 1 associating the CgPSRT music with the Calling Party and storing the association at the Music Platform on the wireless communications network.

5. The method defined in claim 1 further comprising the CgPSRT Subscriber selecting music for the CgPSRT prior to calling the Called Party.

6. The method defined in claim 1 further comprising the CgPSRT Subscriber selecting music for the CgPSRT while calling the Called Party.

7. The method defined in claim 1 further comprising the CgPSRT Subscriber selecting music for the CgPSRT on a per call basis.

8. The method defined in claim 1 further comprising the wireless network selecting music for the CgPSRT.

9. The method defined in claim 1 further comprising releasing the Music Trunk when the Calling Party answers the incoming CgPSRT call.

10. The method defined in claim 1 wherein the CdP_MT does not answer the incoming CgPSRT call using the Dummy Answer.

11. A method of receiving a call at a Called Party Mobile Terminal (CdP_MT) from a wireless communications network comprising:
    receiving a Calling Party Selectable Ring Tone (CgPSRT) Alert message instructing the CdP_MT to connect to a traffic channel and play a CgPSRT as an Alert;
    sending a Dummy Answer message in response to the CgPSRT Alert message;
    connecting to a Music Platform on the wireless network via a traffic channel;
    receiving music from the Music Platform over the traffic channel; and
    playing the music as a CgPSRT for alerting a Called Party to an incoming call.

12. The method defined in claim 11 wherein the receiving step further comprises receiving the CgPSRT Alert message from a Serving MSC serving the CdP_MT in the wireless network.

13. The method defined in claim 11 wherein the Called Party selects the CgPSRT music from the Music Platform for use as the CgPSRT.

14. The method defined in claim 13 wherein the Calling Party selects the CgPSRT music prior to calling the Called Party.

15. The method defined in claim 13 wherein the Calling Party selects the CgPSRT music while calling the Called Party.

16. The method defined in claim 13 further comprising the CgPSRT Subscriber selecting music for the CgPSRT on a per call basis.

17. A method of providing a Calling Party Selectable Ring Tone (CgPSRT) to a Called Party Mobile Terminal (CdP_MT) in a wireless communications network comprising:

receiving call setup messaging from a Calling Party Mobile Terminal (CgP_MT) calling the CdP_MT;

establishing a Music Trunk between a Serving MSC (SMSC) serving the CdP_MT and a Music Platform in a wireless network;

establishing a traffic channel circuit from the SMSC and the CdP_MT in the wireless communications network;

sending a CgPSRT Alert message to the CdP_MT instructing the CdP_MT to connect to the traffic channel and play a CgPSRT as an Alert;

receiving a Dummy Answer Message from the CdP_MT in response to the CgPSRT Alert message;

connecting the CdP_MT to the traffic channel;

connecting the CgP_MT to the traffic channel using conference call circuit;

sending CgPSRT music received from the Music Platform over the Music Trunk to the CdP_MT on the traffic channel for alerting a Called Party to an incoming call from the Called Party using the CgPSRT; and sending the CgPSRT music to the CgP_MT on the conference call traffic channel circuit to enable the Calling Party to hear the CgPSRT music being played as the alert.

18. The method defined in claim 17 further comprising the CgPSRT Subscriber selecting music for the CgPSRT prior to calling the Called Party.

19. The method defined in claim 17 further comprising the CgPSRT Subscriber selecting music for the CgPSRT while calling the Called Party.

20. The method defined in claim 17 further comprising the CgPSRT Subscriber selecting music for the CgPSRT on a per call basis.

\* \* \* \* \*